United States Patent Office 3,296,237
Patented Jan. 3, 1967

3,296,237
STEREOSPECIFIC POLYMERIZATION OF OLEFINS
Alberto Coen and Paolo Parrini, Terni, Italy, assignors to Montecatini Societa Generale per l'Industria Mineraria e Chimica, Milan, Italy, a corporation of Italy
No Drawing. Filed Oct. 23, 1962, Ser. No. 232,611
Claims priority, application Italy, Oct. 27, 1961, 19,340/61
15 Claims. (Cl. 260—93.5)

The present invention relates to a method for the stereospecific polymerization of alpha-olefins.

The present invention is also concerned with a new type of catalytic system which promotes the polymerization of alpha-olefins.

Methods for obtaining high molecular weight, linear olefin polymers having a highly stereoregular structure, using polymerization catalysts consisting of organometallic compounds of metals of Groups II and III of the Mendeleeff Periodic System, particularly alkyl aluminum compounds or alkyl aluminum halides, and transition metal compounds of Groups IV, V and VI of the said Periodic System are known.

It is an object of the present invention to provide a process for the polymerization of alpha-olefins to polymers possessing stereoregular structures.

A further object is to provide a novel catalyst which promotes the stereospecific polymerization of alpha-olefins.

Further objects of the present invention and the advantages thereof will become apparent hereinafter.

We have found that it is possible to carry out the stereospecific polymerization of the alpha-olefins using catalysts containing:

(a) one or more alkylalkenyl metal compounds of metals belonging to Groups II and III of the Mendeleeff Periodic Table, and (b) one or more transition metal compounds of Groups IV, V and VI of the Periodic Table.

Activating substances such as pyridines, amines, phosphines, arsines, bismuthines, and/or ethers can also, if desired, be added to these catalysts.

Some examples of olefins which are particularly suitable for use with these catalysts are: ethylene, propylene, butene-1, 4-methylpentene-1, and compounds, either alone or in admixture with each other or other monomers.

Alkylalkenyl metal compounds, such as diethylmonovinyl aluminum, ethyldivinyl aluminum, diethylallyl aluminum, ethyldiallylaluminum, ethylallylzinc, ethylvinylzinc, ethylvinylberyllium, ethylallyl beryllium and similar compounds, are particularly suitable for use in the catalyst of the present invention.

Some examples of particularly suitable transition metal compounds are: titanium-, zirconium-, vanadium-, germanium- and tin halides, etc.

Transition metal compounds which are especially suitable for use in the catalyst of the instant invention may be further characterized as having the formula:

$$MeCl_p$$

wherein Me represents titanium or vanadium, and $p$ is 3 or 4.

Aluminum-containing compounds of the formula:

$$AlR'_nR''_m$$

wherein R' is an ethyl group, R'' represents a vinyl group, and $m$ and $n$ are integers the sum of which is equal to 3, are especially effective as component (a) in the catalyst of the present invention.

When zinc-containing compounds are employed as component (a), these compounds may be characterized as having the formula:

$$Zn_nR'R''$$

wherein R' represents a methyl group, and R'' represents a vinyl group.

It should be understood that the above-mentioned alkylalkenyl metal compounds and transition metal compounds are given only as examples to illustrate the present invention and are not intended to limit the scope thereof.

The polymerization can be carried out in the presence or in the absence of a hydrocarbon solvent which acts as a dispersing agent for the polymer thus formed. n-Hexane, n-heptane, benzene, cumene, etc., or like compounds may be employed as this solvent.

The polymerization is carried out under pressures of 1–100, preferably between 10 and 30, atmospheres. The polymerization temperature is preferably between 50° and 100° C.

If desired, one or more substances capable of regulating the molecular weight, such as hydrogen, diethylzinc, mixtures of diethylzinc and hydrogen or similar compounds can be added to the catalytic system of the present invention.

At the termination of the polymerization, which is carried out in the absence of oxygen and moisture, the polymer slurry may undergo a clarification treatment using water, mineral acids, alkaline substances, alcohols, halogen derivatives, amines, organic sulphites, dialdehydes, diketones, oximes, lactones, amides, alkenyl carbonates, etc., alone or mixtures thereof.

The hydrocarbon solvent retained with the polymer cake is then removed by drying or stripping. Eventually this cake is dispersed in water containing a suitable surfactant agent.

The use of alkylalkenyl metal compounds as the organometallic component of the catalytic system according to the present invention, in comparison with the use of the corresponding alkyl metal compounds and alkenyl metal compounds, produces advantages such as:

(1) An unexpected increase in the polymer yield, and
(2) A higher percentage of isotactic macromolecules, and
(3) A lower ash content.

These alkylalkenyl metal compounds, in contrast to the pure alkenyl metal compounds, have a lower tendency toward spontaneous homopolymerization and are also liquid compounds, soluble in hydrocarbon and therefore easier to use.

The polymers obtained by the polymerization process of the present invention have a variety of uses and can be extruded as fibers and molded into a variety of other shaped articles.

The following examples are given to illustrate the present invention without limiting it.

*Example 1*

Into a 1-liter stainless steel reactor there are introduced: 0.3 l. of n-heptane, $2.3 \times 10^{-3}$ mols of $TiCl_3$ and $11.5 \times 10^{-3}$ mols of diethylmonovinyl aluminum.

The temperature is raised to 70° C. while stirring the mass and propylene is added gradually, taking care that the pressure does not exceed 16 atmospheres.

The polymerization is carried out for 5 hrs.

At the end of the polymerization, the slurry is clarified by the addition of methanol and hydrochloric acid. The slurry is then stirred for 2 hrs. at 20° C. and the product is centrifuged. The polymer is collected and dried. There is obtained with a total yield of 100 g. a polymer having the following characteristics:

$[\eta] = 4.2$ (measured in tetrahydronaphthalene at 135° C.)
Ash content = 0.03%
Residue after the heptane extraction = 83%
Melting point = 167 (determined by the dilatometric method)

Density=0.870
Crystallinity under X-ray=51%

The polymer consists prevailingly (more than 50%) of isotactic macromolecules.

Example 2

There are introduced into a 1-liter oscillating stainless steel reactor: 0.3 l. of n-heptane, $1.75 \times 10^{-3}$ mols of $TiCl_3$ and $8.7 \times 10^{-3}$ mols of ethyldivinyl aluminum.

The temperature is raised to 70° C. under stirring, and propylene is gradually introduced, taking care that the pressure does not go over 15 atmospheres.

The polymerization is carried out for 5 hrs.

At the end of the polymerization, the slurry is clarified by the addition of methanol and hydrochloric acid. The slurry is then kept under stirring for 2 hrs. at 20° C. and the product is centrifuged. The polymer is collected and dried.

There is obtained a total yield of 70 g. of polymer having the following characteristics:

$[\eta]$=9.5 (measured in tetrahydronaphthalene at 135° C.)
Ash content=0.02%
Residue from the heptane extraction=94%
Melting point=167° C. (determined with the dilatometric method)
Density=0.8850
Crystallinity under X-ray=65%

The polymer is shown to consist prevailingly of isotactic macromolecules upon X-ray examination.

Example 3

Into a 1-liter stainless steel oscillating reactor there are introduced 0.3 l. of n-heptane, $2 \times 10^{-3}$ mols of $TiCl_3$ and $12 \times 10^{-3}$ mols of diethylmonovinyl aluminum.

The temperature is raised up to 70° C under stirring and propylene is gradually introduced while taking care that the pressure does not exceed 13 atmospheres.

The polymerization is carried out for 5 hrs.

At the end of polymerization, the slurry is clarified by the addition of methanol and hydrochloric acid thereto. The slurry is then kept under stirring for 2 hrs. at 20° C., and the product is centrifuged. The polymer is collected and dried. There is obtained a total yield of 60 g. of polymer possessing the following characteristics:

$[\eta]$=6.7 (measured in tetrahydronaphthalene at 135° C.)
Ash content=0.06%
Residue after the heptane extraction=90%
Melting point=166° C. (determined in the dilatometric method)
Density=0.872

Under X-ray examination the polymer is shown to consist prevailingly of isotactic macromolecules.

Example 4

Into a 1-liter oscillating stainless steel reactor there are introduced: 0.285 l. of n-heptane, $3 \times 10^{-3}$ mols of $VCl_4$ and $8.5 \times 10^{-3}$ mols of ethylvinylzinc.

The temperature is raised to 70° C. under stirring and ethylene is gradually introduced taking care that the pressure does not go above 30 atmospheres.

The polymerization is carried out for 18 hours. At the end of the polymerization, the slurry is clarified by the addition of methanol and hydrochloric acid. The slurry is kept under stirring for 2 hrs. at 20° C. and the product is centrifuged. The polymer is collected and dried.

There is obtained a total yield of 66 g. of polymer possessing the following characteristics:

$[\eta]$=11.7 (measuring in tetrahydronaphthalene at 135° C.)
Ash content=0.05%
Melting point=136° C. (determined by the dilatometric method)
Density=0.918

An X-ray examination shows that this polyethylene is a linear polyethylene.

Example 5

Into a 1-liter stainless steel oscillating reactor there are introduced: 0.3 l. of n-heptane, $2.5 \times 10^{-3}$ mols of $VCl_3$ and $12.5 \times 10^{-3}$ mols of diethylmonovinylaluminum.

The temperature is raised to 70° C. under stirring and propylene is gradually introduced while taking care that the pressure does not go above 16.4 atmospheres.

The polymerization is carried out for 15 hrs. At the end of the polymerization, the slurry is clarified by addition of methanol and hydrochloric acid. The slurry is then kept under stirring for 2 hrs. at 20° C., and the product is centrifuged. The polymer is collected and dried.

There is obtained a total yield of 184 g. of polymer having the following characteristics:

$[\eta]$=5.7 (measured in tetrahydronaphthalene at 135° C.)
Ash content=0.04%
Residue after heptane extraction=79%
Density=0.88

X-ray examination shows that the polypropylene consists prevailingly of isotactic macromolecules.

Example 6

There are introduced into a 1-liter oscillating stainless steel reactor the following: 0.3 l. of n-heptane, $3.4 \times 10^{-3}$ mols $VCl_3$ and $17 \times 10^{-3}$ mols ethyldivinylaluminum.

The temperature is raised to 70° C. under stirring and propylene is gradually introduced while maintaining the pressure at a value not exceeding 14 atmospheres.

The polymerization is carried out for 15 hrs. At the end of the polymerization, the slurry is clarified by the addition of methanol and hydrochloric acid. The slurry is kept under stirring for 2 hrs. at 20° C. and the product is centrifuged. The polymer is collected and dried.

There is obtained a total yield of 13 g. of polymer having the following characteristics:

$[\eta]$=5.7 (measured in tetrahydronaphthalene at 135° C.)
Ash content=0.05%
Residue after the heptane extraction=85%
Density=0.8740

Examination under X-ray shows that the polypropylene obtained consists prevailingly of isotactic macromolecules.

Example 7

0.2 l. of n-heptane, $3 \times 10^{-3}$ mols of $TiCl_3$ and $9 \times 10^{-3}$ mols of aluminum diethyl vinyl are introduced into a 1-liter oscillating stainless steel reactor.

50 cc. of 4-methylpentene-1 freshly distilled on sodium are then added.

The temperature is raised to 50° C. and after agitation for 2 hours the slurry is precipitated with methanol at room temperature.

The polymer thus formed is repeatedly washed with methanol and hydrochloric acid and is then centrifuged and dried.

18.3 g. of polymer having the following characteristics are thus obtained.

$\eta$ spec./C=1.45 (C=concentration of 0.1%) determined in tetrahydronaphthalene at 135° C.
Melting point=230° C.
Density=1.12

Upon X-ray examination the polymer is shown to consist prevailingly of isotactic macromolecules and exhibit crystallinity.

Example 8

0.2 l. of benzene, $3 \times 10^{-3}$ mols of $TiCl_3$ and $9 \times 10^{-3}$ mols of aluminum diethyl vinyl are introduced into a 1-liter oscillating stainless steel reactor. 50 cc. of fresh distilled styrene are then added.

The whole mass is heated to 80° C. and the reaction is continued for 3 hours.

The polymer thus obtained is then precipitated with methanol, repeatedly washed with methanol and hydrochloric acid and dried.

8 g. of the polymer having the following characteristics are obtained:

$\eta$ spec./C=1.28 (C=concentration of 0.1%) determined in tetrahydronaphthalene at 135° C.

Melting point=224° C.

Upon X-ray examination the polymer is shown to consist prevailingly of isotactic macromolecules and shows the crystalline structure.

Many variations and modifications can, of course, be practiced without departing from the scope and spirit of the present invention.

Having thus described the invention, what it is desired to secure and claim by Letters Patent is:

1. A process for the stereospecific polymerization of olefins to high molecular weight polymers having a stereoregular structure, which comprises polymerizing at least one monomer of an olefin having more than 2 carbon atoms in the presence of a catalytic system comprising (a) at least one metalloalkylalkenyl compound of a metal selected from the group consisting of Groups II and III of the Mendeleeff Periodic Table wherein all of the valences of the metal are satisfied by alkyl and alkenyl radicals and (b) at least one transition metal compound selected from the group consisting of $TiCl_3$, $VCl_3$, and mixtures thereof.

2. The polymerization process of claim 1 wherein said olefin monomer is propylene, 4-methyl-pentene-1, or styrene.

3. The polymerization process of claim 1 wherein said compound (a) is an aluminum compound or a zinc compound.

4. The polymerization process of claim 1 wherein the alkyl group of said compound (a) is an ethyl group.

5. The polymerization process of claim 1 wherein the alkenyl group of said compound (a) is a vinyl group.

6. The polymerization process of claim 1 wherein said compound (a) is diethylmonovinyl aluminum, ethyldivinyl aluminum or ethylvinyl zinc.

7. The polymerization process of claim 1 wherein said metal compound is $TiCl_3$.

8. The polymerization process of claim 1 wherein said metal compound is $VCl_3$.

9. The polymerization process of claim 1 wherein the polymerization is carried out at a temperature between 50° and 100° C.

10. The polymerization process of claim 9 wherein the polymerization is carried out at 70° C.

11. The polymerization process of claim 1 wherein the polymerization is carried out in the presence of a hydrocarbon solvent which acts as a dispersing agent for the polymer formed.

12. The polymerization process of claim 11 wherein n-heptane is employed as said solvent.

13. The polymerization process of claim 1 which is carried out under a pressure between 1 and 100 atm.

14. The polymerization process of claim 13 which is carried out under a pressure between 10 and 30 atm.

15. The polymerization process of claim 1 wherein at the termination of the polymerization, the polymer slurry is subjected to a clarification treatment employing alcohols acidified with mineral acids.

References Cited by the Examiner

UNITED STATES PATENTS

| 3,059,036 | 10/1962 | Honeycutt | 260—94 |
| 3,100,217 | 8/1963 | Bartocha | 260—94 |

FOREIGN PATENTS

| 869,492 | 5/1961 | Great Britain. |

JOSEPH L. SCHOFER, *Primary Examiner.*

F. L. DENSON, *Assistant Examiner.*